Dec. 15, 1931.  A. URFER  1,836,693
WINDMILL
Filed July 10, 1930   3 Sheets-Sheet 1

Inventor
ADOLF URFER
By his Attorney
Bohleber + Ledbetter

Dec. 15, 1931.  A. URFER  1,836,693
WINDMILL
Filed July 10, 1930   3 Sheets-Sheet 2

Inventor
ADOLF URFER
By his Attorney
Bohleber + Ledbetter

Dec. 15, 1931.  A. URFER  1,836,693
WINDMILL
Filed July 10, 1930  3 Sheets-Sheet 3

Inventor
ADOLF URFER
By his Attorney
Bohleber & Ledbetter

Patented Dec. 15, 1931

1,836,693

UNITED STATES PATENT OFFICE

ADOLF URFER, OF RICHMOND HILL, NEW YORK, ASSIGNOR TO PIONEER INSTRUMENT COMPANY, INCORPORATED, OF BROOKLYN, NEW YORK, A CORPORATION OF NEW YORK

WINDMILL

Application filed July 10, 1930. Serial No. 467,006.

This invention relates to wind driven instruments or means. In particular, the invention provides a windmill adapted to drive a generator, as for example an inductor compass generator and for other purposes.

An object of the invention is to produce a windmill which has rotatable blades having fixed and movable portions and which is dynamically balanced.

Another object of the invention is to produce a windmill which has rotatable blades having fixed and movable portions and which is dynamically balanced at all speeds of the windmill.

Another object of the invention is to construct a windmill whose speed of rotation is controlled, irrespective of the speed of the air or fluid driving it or the speed of the aeroplane upon which the windmill is mounted, by a centrifugal governor which is light in weight compared with the weight of the entire windmill.

Another object is to construct a windmill for driving generators and the like and which windmill is provided with fixed blades and movable blades.

A still further object is to devise a windmill with impeller blades which have fixed and movable portions and the movable portions of the impeller blades being movable from cooperative relation with the fixed portions to control the speed of the windmill.

A further object of the invention is to construct a windmill having fixed blades and movable blades normally in alignment with the fixed blades and mechanism to control the relative position of the blades.

Other objects of the invention will be more apparent from the following description taken in connection with the accompanying drawings in which.

Figure 1:
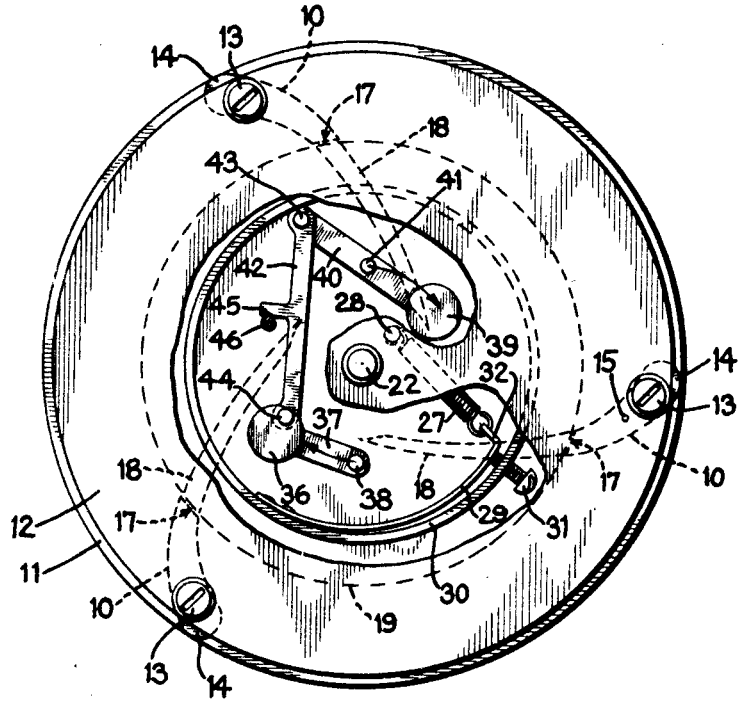
Figure 1 is a plan view of the windmill with one of its plates cut away exposing the centrifugal governor and showing the movable blades in alignment with the fixed blades, both blades being shown in dotted lines.
Figure 2:
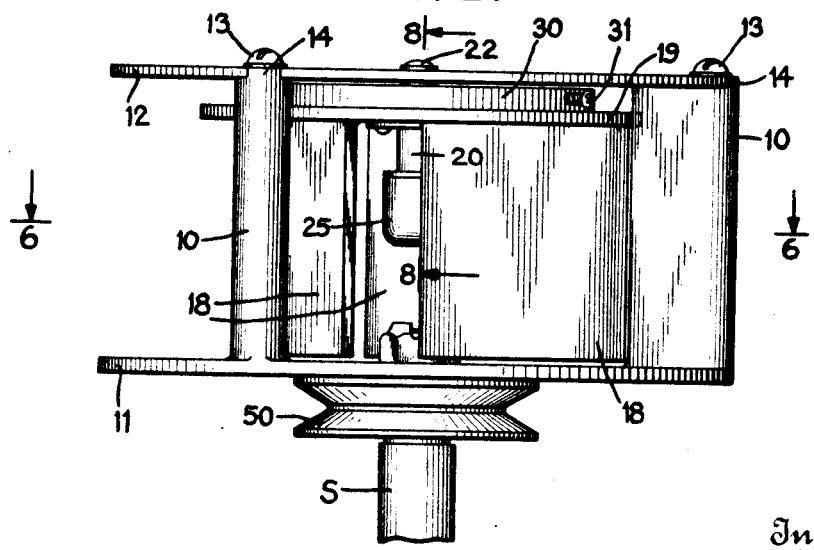
Figure 2 is a side view of the windmill shown in Figure 1.

The windmill described herein is adapted to drive the generator of an inductor compass which generator is to rotate at a substantially constant speed. The speed of the driving windmill is determined by the speed of the aeroplane and hence an increased speed of the aeroplane would result in an increased speed of rotation of the windmill and compass generator. In order to maintain the speed of the windmill within permissible limits so that the speed is substantially constant, the windmill is controlled by a governor.

An inductor compass generator should be rotated at a comparatively high speed and consequently the driving windmill must also rotate at high speed. The compass generator is a more or less delicate piece of mechanism and it is important therefore that the windmill be in dynamic balance otherwise vibrations will be set up in the windmill which will not only affect the accuracy of the compass but will also prove destructive to the generator.

The windmill consists of a plurality of fixed vanes or blades 10 disposed between a lower plate 11 and an upper plate 12. In the preferred construction the blades 10 are integral with the lower plate 11 and the upper plate 12 is secured to the upper edges of the blades 10 by means of the screws 13 so that the fixed blades 10 are disposed between the spaced plates 11 and 12. Each of the blades 10 has a shoulder 14 to assist in centering the upper plate upon the blades. In addition, a locating pin 15 is secured to one of the blades which projects through a hole in the upper plate 12 so that the upper plate cannot be mounted upon the fixed blades in any other position excepting in the position in which the plate was mounted thereupon at the time the windmill was balanced.

Figure 8:
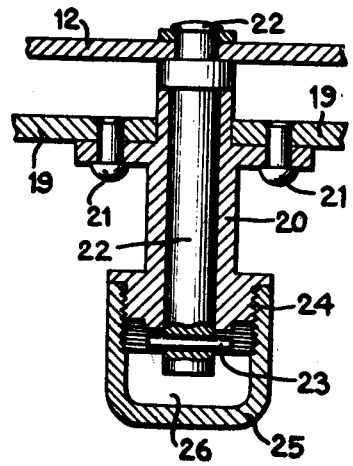
Figure 8 is a section through the center of the windmill showing the mounting for the movable blades which section is taken on line 8—8 of Figure 2.

The spaced inner edges 17 of the fixed blades 10 are spaced from each other and provide a central opening towards which the impelling fluid is directed from the fixed blades. Within this central opening there is provided a plurality of movable blades 18. These movable blades are preferably integral with a supporting plate 19 and the plate is in turn secured to a bearing member 20 shown in Figure 8, by means of the rivets 21. The bearing member 20 and the movable blades are rotatably carried by a pivot 22 which pivot is securely anchored to and extends downwardly from the upper plate 12. The end of the pivot 22 carries a pin such as the dowel pin 23 which pin retains the movable blades upon the pivot. The end of the bearing member 20 carries screw threads 24 to receive a combined dust cap and oil well 25. This dust cap keeps dirt from the pivot 22 for the movable vanes and, in addition thereto, the oil well 25 within the dust cap may be filled with oil and provide lubrication to the bearing.

Normally the movable blades 18 are in alignment with the fixed blades 10 and both blades form a combined blade in aligned position. Each fixed and movable blade may also be said to be an impeller blade having fixed and movable portions in which the movable portion is displaceable from cooperative relation with the fixed portion. The movable portions need not be disposed at the center of the fixed portions and any construction wherein the movable portions of the blades are displaceable from alignment with the fixed portions is within the scope of the invention. In such position the impelling air or fluid impacts upon the fixed and movable blades and is directed to a central spillway formed by the spaced inner edges of the combined or movable blades 18. This central spillway provides an outlet for the impelling air or fluid as it leaves the combined blade formed by the fixed and movable blades and the air then passes radially outward therefrom through the blades of the windmill in a direction towards the rear of the flight of the aeroplane.

Figure 5:
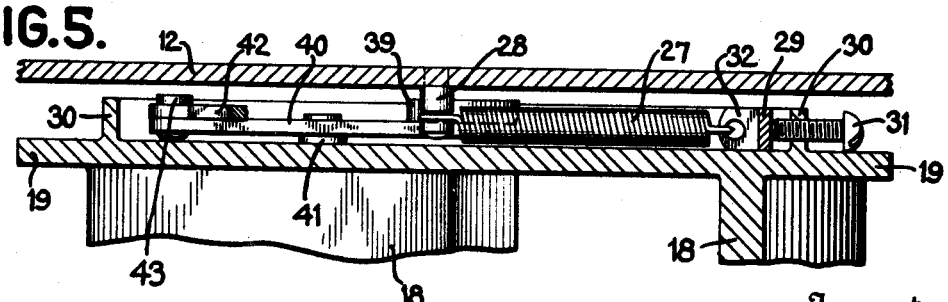
Figure 5 is a section taken on line 5—5 of Figure 3 showing additional details of the centrifugal governor.
Figure 6:
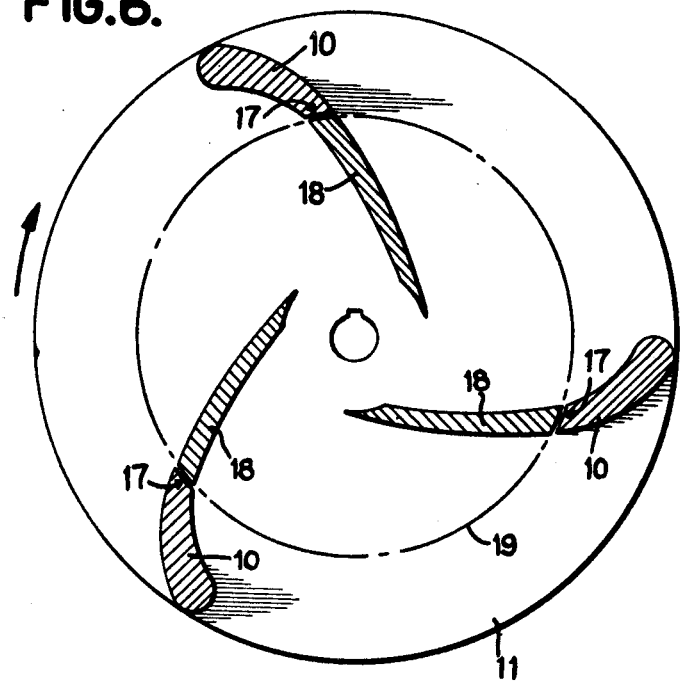
Figure 6 is a section through the fixed and movable blades of the windmill with the blades in alignment taken on line 6—6 of Figure 2.
Figure 7:
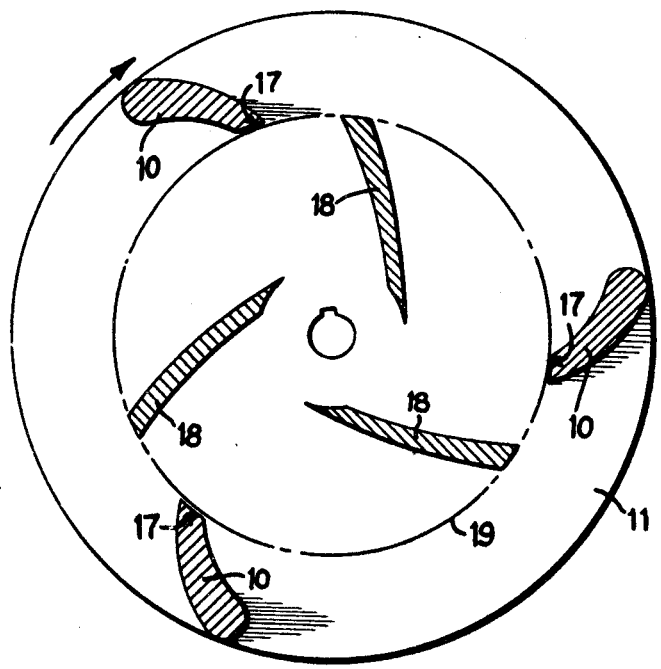
Figure 7 is a section through the fixed and movable blades of the windmill with the movable blades out of alignment with the fixed blades.

The movable blades 18 are rotatably mounted upon the pivot 22 as above described, and a spring 27 (Figure 5) retains the movable blades 18 in alignment with the fixed blades 10. The spring 27 is secured at one end to the spring pin 28 which pin is anchored to the top plate 12, as shown in Figure 5. The other end of the spring 27 is attached to the free end 32 of an adjusting spring 29, the other end of the adjusting spring 29 being attached to the wall of a governor housing 30 carried by the supporting plate 19. An adjusting screw 31 threaded through the housing 30 engages the adjusting spring 29 and controls thereby the tension in the spring 27 and the speed at which the governor begins to function.

Figure 4:
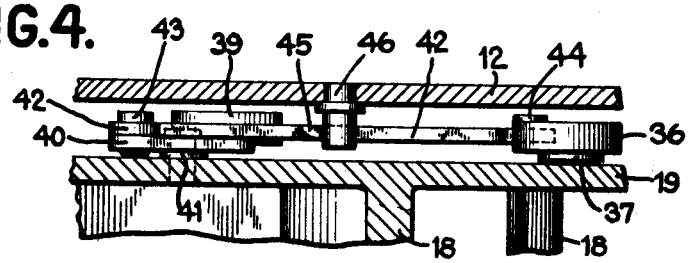
Figure 4 is a section through the windmill on line 4—4 of Figure 3 showing details of the centrifugal governor.

Enclosed within the governor housing 30 is a centrifugal governor which moves the movable blades 18 out of alignment with the fixed blades 10 when the speed of the windmill goes above a predetermined speed. The governor operates against the spring 27 which tends to keep the movable blades in alignment with the fixed blades. The governor consists of a centrifugal weight 36 carried upon a weight lever 37 mounted on the support plate 19 on the pivot 38. A second weight 39 is carried upon a weight lever 40 mounted on the supporting plate 19 on the pivot 41. The weights 36 and 39 comprise a pair of centrifugal governor weights and each weight is diametrically opposite each other from the center of rotation of the windmill which corresponds to the center of the pivot 22. A connecting link 42 is operatively connected at one end to the weight lever 40 by means of the pivot 43 and at its other end to the weight 36 by means of the pivot 44. The connecting link 42 carries a shoulder 45 which engages a fixed pin 46 anchored in the upper plate 12, as shown in Figure 4. This connecting link operatively connects the centrifugal weights so that their action will be uniform. Obviously the movable blades may be adjusted to any position if desired and the governor dispensed with where automatic regulation is not desirable.

Figure 3:
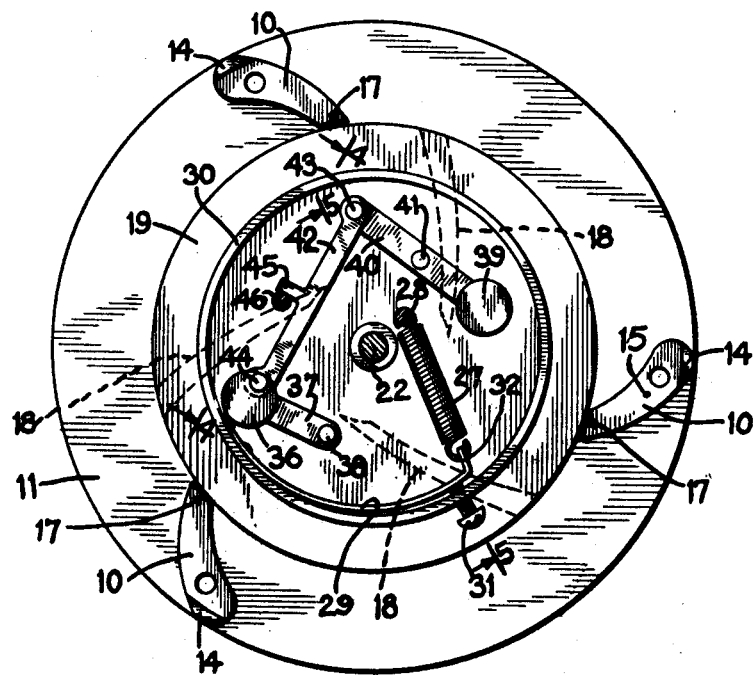
Figure 3 is a plan view of the windmill with one of the plates removed exposing the centrifugal governor with the weights in extended position and showing the movable blades in dotted lines displaced from alignment with the fixed blades.

The operation of the centrifugal governor to control the position of the movable vanes 18 will now be described. With the movable vanes 18 in alignment with the fixed blades 10, as shown in Figure 1, the centrifugal weights 36 and 39 are at their minimum distance from the center of rotation which corresponds with the center of the movable blade pivot 22. The movable blades are held in aligned position by the spring 27, the force of which is applied to the movable blades through the adjusting spring 29, it being recalled that pin 28 to which the other end of the spring is attached, is anchored in the upper plate 12, as shown in Figure 5. When the windmill is rotating at a speed so that the centrifugal force upon the weights 36 and 39 is great enough to impel the centrifugal weights radially outward upon their respective pivots 38 and 41 against the tension of the spring 27, this radial movement of the weights tends to move the connecting link 42 downwardly, as viewed in Figure 1, but this movement is prevented by the shoulder 45 engaging the pin 46 which is anchored in the upper plate 12 as previously described. The shoulder 45 upon the link 42 engaging the pin 46 prevents any axial movement of the link and as a result the centrifugal force on the weights rotates the pivots 38 and 41 in the direction of the arrows shown in Figure 1. It will be recalled that the weight lever pivots 38 and 41 are anchored to the supporting plate 19 of the movable blades so that the rotation of the pivots 38 and 41 impels the movable blades 18 away from alignment with the fixed blades 10 to the position shown in Figure 3. This rotation of the movable blade 18 is resisted by the spring 27 as previously described.

The movable blades 18 are shown and described herein as being secured together and rotatable out of alignment with the fixed blades 10 upon a single central pivot 22. This is the preferred construction and the invention contemplates any method pivotal or otherwise of moving the movable blades 18 out of alignment with the fixed blades 10. Similarly in the preferred construction the fixed blades form the outer blades of the combined blades of the windmill although the fixed blades may be either the inner or outer blades. It is believed that the moving of the movable blades out of alignment with the fixed blades under the action of the impelling air causes eddy currents to be set up within the windmill which render it less efficient and any movement of the movable blades having this result is within the scope of this invention.

As previously mentioned, it is important that the windmill is dynamically balanced. This balance is obtained in a manner now to be described. The fixed blades 10 are uniformly spaced around the axis of rotation of the windmill so that the fixed blades are dynamically balanced. Similarly the movable blades are uniformly distributed around the axis of rotation of the windmill which corresponds with the pivot 22 so that the movable blades also are in dynamic balance. Inasmuch as the movable blades are always equally spaced with respect to the axis of rotation, the movable blades are always in dynamic balance irrespective of the relative position of the movable blades with the fixed blades.

The fixed blades 10 are integral with the lower plate 11 and a pulley 50. The upper plate 12 which is secured to the fixed blades is purposely thinner than the lower plate, the reason for which will be explained. The supporting plate 19 which carries the movable blades 18, the governor housing 30 and the governor mechanism are all adjacent to the upper plate 12. The weights of these relative parts are so proportioned that the total mass of material at the bottom of the windmill is approximately equal with the total mass at the top of the windmill thereby obtaining dynamic balance of the windmill.

Balancing of the governor parts irrespective of their position is obtained by making the centrifugal weights 36 and 39 of equal weight and placing them diametrically opposite each other from the axis of rotation. The weight 36 is mounted upon a weight lever 37 which is balanced by the portion of the weight lever 40 between the weight 39 and the pivot 41. The connecting link 42 and that portion of the weight lever 40 between the pivots 43 and 41 is balanced by the spring 27, the adjusting spring 29 and the adjusting screw 31. This arrangement of parts substantially renders the entire windmill dynamically balanced so that at the speed at which the windmill rotates there are no unbalanced forces which would set up destructive vibrations to impair the accuracy of the compass generator or to injure the compass mechanism. The balance may not be a perfect one for all positions of the movable parts but any unbalance which may exist is so slight with respect to the entire mass of the windmill which is purposely made considerably greater than the mass of the centrifugal parts that its effect is negligible at the speed at which the windmill normally rotates.

The windmill described herein is mounted upon a shaft S, for example that of an inductor compass generator and projects above that part of the aeroplane upon which it is mounted and into the wind stream set up by the aeroplane when it is in motion. The air impacts upon the fixed and movable blades 10 and 18 of the windmill which air is directed towards the central air spillway thereby rotating the windmill. If the aeroplane is traveling at a higher than normal speed, the impacting air exerts a greater force on the windmill blades and tends to rotate the windmill at a higher rate of speed. This higher speed of rotation of the windmill sets the centrifugal governor into action so that the movable blades 18 are drawn out of alignment with the fixed blades 10 and opens up an outlet between the end of the fixed blades and the movable blades so that the full power area of the combined fixed and movable blades is not available. In addition thereto, the air passing between the end of the fixed and movable blades is believed to set up eddy currents which reduces the efficiency of the wheel so that the increased speed of the aeroplane, or the increased speed with which the impacting air strikes the windmill, is counteracted by the lesser efficiency of the windmill so that it maintains a substantially uniform speed.

The normal speed of the windmill may be adjusted at will by increasing or decreasing the tension of the spring 27 in Figure 1. Adjusting the tension of the spring 27 is accomplished by screwing the adjusting screw 31 farther into the housing 30 so that the end of the screw moves the adjusting plates or leaf spring 29 closer to spring pin 28. This reduces the tension of the spring 27 and reduces the normal speed of the windmill. Similarly by unscrewing the adjusting screw 31 out of the housing as far as it will go, the adjusting spring 29 moves toward the housing and increases the distance between the adjusting spring 29 and the pin 28 thereby increasing the tension of the spring 27 and increasing the normal speed of the windmill.

The spring pin 28 may be secured upon the top plate 12 in any position. If a position such as point 52 (Figure 3) be selected, the spring 27 exerts a tension upon the movable blades 18 which is determined by the tension of the spring and the lever arm of the spring. When the movable blades 18 are in alignment with fixed blades and spring 27 is attached to a pin 52 (Figure 3) the lever arm is short. Now as the centrifugal weights 36 and 39 force the movable blades 18 out of alignment with the fixed blades 10 the point of attachment of the spring 27 upon the free end 32 of the spring 29 rotates while the spring pin 52 remains stationary. This movement will not only stretch the spring 27 and increase the force exerted by the spring because of its increased tension, but also increases the lever arm through which the spring 27 exerts its tension upon the movable blades. The lever arm is determined by the length of a line normal to the axis of the spring 27 as measured between the axis of the spring and the center of the pivot 22. If desired, this increase in the lever arm of the spring 27 may be taken advantage of to increase more rapidly or at a greater rate the force which tends to return the movable blades 18 to aligned position with the fixed blades than the rate of increase in force exerted by the centrifugal weights upon increase in the speed of rotation of the windmill which force increases as the square of the speed of rotation of the windmill. Such construction eliminates so called hunting in the windmill and its governor mechanism which tends to wear the bearings on all parts.

Although the movable blades are shown and described herein as moving backward with respect to the fixed blades, it is to be understood that the same effect is produced whether the movable blades move backwardly relatively to the fixed blades or if the movable blades are displaced in some other manner from their aligned position with the fixed blades.

The invention is described by reference to one preferred example of construction and it is to be understood that other forms come within the principles involved and among other things

What is claimed is:

1. A windmill comprising a pair of rotatable spaced plates, a plurality of rotatable impeller blades disposed between the spaced plates, each impeller blade having a fixed and a movable portion, the inner ends of the blades being spaced from each other forming a central spillway, and means controlled by the operation of the windmill to displace the movable portion of the blade with respect to the fixed portion.

2. A windmill comprising a plurality of fixed blades, a plurality of movable blades normally in alignment with the fixed blades forming combined blades and displaceable away from and out of alignment therewith to form a variable gap therebetween, and means operatively connected with the movable blades and arranged to be actuated by the operation of the windmill to vary the position of the movable blades with respect to the fixed blades to maintain a substantially constant speed of rotation of the windmill.

3. A windmill comprising a plurality of fixed blades, a plurality of movable blades secured together, the movable blades being normally in alignment with the fixed blades forming combined blades and displaceable from alignment therewith, the inner ends of the combined blades being spaced from each other to form a central spillway, and means in a plane perpendicular to the edges of the blades and controlled by the speed of the windmill to vary the position of the movable blades with respect to the fixed blades to maintain a substantially constant speed of rotation of the windmill.

4. A windmill comprising a plurality of fixed blades having their inner ends spaced from each other forming a central opening, a plurality of movable blades in the central opening having their inner ends spaced from each other forming a central spillway, the movable blades being normally in alignment with the fixed blades and displaceable from alignment therewith, and means carried by the movable blades and controlled by the speed of the windmill to displace the movable blades from their position of alignment with respect to the fixed blades.

5. A windmill comprising a pair of spaced plates, a plurality of fixed blades disposed between the plates and having their inner ends spaced from each other forming a central opening, a plurality of movable blades in the central opening having their inner ends spaced from each other forming a central spillway, the movable blades being normally in alignment with the fixed blades and displaceable from alignment therewith, a supporting plate securing the movable blades together, and means upon the plate in a plane parallel thereto and controlled by the speed of the windmill to displace the movable blades from their position of alignment with respect to the fixed blades.

6. A windmill comprising a pair of spaced plates, a plurality of fixed blades disposed between the plates and having their inner ends spaced from each other forming a central opening, a pivot secured to one of the spaced plates, a rotatable supporting plate mounted upon the pivot, a plurality of movable blades carried by the supporting plate in the central opening and having their inner ends spaced from each other forming a central spillway, the movable blades being normally in alignment with the fixed blades and rotatable from alignment therewith, means upon the supporting plate and controlled by the speed of the windmill to displace the movable blades from their position of alignment with respect to the fixed blades.

7. A windmill comprising a pair of spaced plates, a plurality of fixed blades disposed between the plates and having their inner ends spaced from each other forming a central opening, a pivot secured to one of the spaced plates, a plurality of movable blades mounted in the central opening upon the pivot and having their inner ends spaced from each other forming a central spillway, a spring to hold the movable blades normally in alignment with the fixed blades and rotatable from alignment therewith, and means controlled by the speed of the windmill to displace the movable blades from their position of alignment with respect to the fixed blades.

8. A windmill comprising a plurality of fixed blades having their inner end spaced from each other forming a central opening, a pivot mounted centrally in the opening, a rotatable supporting plate mounted upon the pivot, a plurality of movable blades secured in the central opening upon the supporting plate and having their inner ends spaced from each other forming a central spillway, a governor housing upon the supporting plate, a spring in the housing and attached to the movable blades to resiliently retain the blades normally in alignment with the fixed blades, and a governor within the housing controlled by the speed of the windmill to displace the movable blades from their position of alignment with respect to the fixed blades.

9. A windmill comprising a pair of spaced plates, a plurality of fixed blades disposed between the plates and having their inner ends spaced from each other forming a central opening, a pivot secured to one of the spaced plates, a supporting plate rotatably mounted upon the pivot, a plurality of movable blades carried in the central opening by the supporting plate and having their inner ends spaced from each other forming a central spillway, a governor housing upon the supporting plate, a spring within the housing and attached to the movable blades to retain the blades normally in alignment with the fixed blades, and a governor within the housing controlled by the speed of the windmill to displace the movable blades from their position of alignment with respect to the fixed blades.

10. A windmill comprising a lower plate, an upper plate spaced therefrom, a plurality of fixed blades carried between the plates having their inner ends spaced from each other forming a central opening, a plurality of movable blades disposed in the central opening and normally in alignment with the fixed blades, the inner ends of the movable blades being spaced from each other forming a fluid spillway, and a governor mounted upon the edges of the movable blades adjacent to one of the spaced plates and controlled by the speed of the windmill to displace the movable blades from alignment with the fixed blades, the mass of the governor and of the spaced plate adjacent thereto balancing the mass of the other spaced plate.

11. A windmill for an inductor compass comprising a plurality of fixed blades, a plurality of movable blades normally in alignment with the fixed blades and forming combined blades, a central spillway formed by the spaced inner edges of the combined blades, a spring normally retaining the movable blades in alignment with the fixed blades, and a centrifugal governor to displace the movable blades from alignment with the fixed blades, the governor parts and spring being substantially in the same plane normal to the axis of rotation.

12. A windmill for an inductor compass comprising a plurality of fixed blades, a plurality of movable blades normally in alignment with the fixed blades and forming combined blades, a central spillway formed by the spaced inner edges of the combined blades, a spring normally retaining the movable blades in alignment with the fixed blades, means to adjust the tension in the spring, and a centrifugal governor to displace the movable blades from alignment with the fixed blades, the governor parts and spring being substantially in the same plane normal to the axis of rotation.

13. A windmill for an inductor compass comprising a plurality of fixed blades, a plurality of movable blades normally in alignment with the fixed blades and forming combined blades, a central spillway formed by the spaced inner edges of the combined blades, a spring spaced from the center of rotation normally retaining the movable blades in alignment with the fixed blades, a centrifugal governor in substantially the same plane as the spring and normal to the axis of rotation to displace the movable blades from alignment with the fixed blades including a pair of centrifugal weights diametrically opposite each other from the axis of rotation, and means operatively connecting the weights and disposed diametrically opposite the axis of rotation from the spring.

14. A windmill for an inductor compass comprising a plurality of fixed blades, a plurality of movable blades normally in alignment with the fixed blades thereby forming combined blades, a central spillway formed by the spaced inner edges of the combined blades, a spring normally retaining the movable blades in alignment with the fixed blades, a centrifugal governor to displace the movable blades from alignment with the fixed blades including a pair of pivoted levers diametrically opposite each other from the axis of rotation, a centrifugal weight carried by each lever and positioned diametrically opposite each other from the axis of rotation, and a link operatively connecting the two weights together and disposed opposite the spring from the axis of revolution.

15. A windmill for an inductor compass comprising a plurality of fixed blades having a central opening, a plurality of movable blades within the central opening and normally in alignment with the fixed blades, a central spillway formed by the spaced inner edges of the movable blades, a governor housing upon the edges of the movable blades, a spring within the housing normally retaining the movable blades in alignment with the fixed blades, an adjusting spring upon the housing to which the spring is attached, and a centrifugal governor within the housing to displace the movable blades from alignment with the fixed blades.

16. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate and anchored at the other end to the supporting plate to retain the movable blades in alignment with the fixed blades, and a centrifugal governor upon the supporting plate to rotate the movable blades from alignment with the fixed blades.

17. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate and anchored at the other end to the plate and anchored to the supporting plate to retain the movable blades in alignment with the fixed blades, means to adjust the tension of the spring, and a centrifugal governor upon the supporting plate to rotate the movable blades from alignment with the fixed blades.

18. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate, an adjusting spring secured to the supporting plate and having a free end to which the other end of the spring is attached to retain the movable blades in alignment with the fixed blades, and a centrifugal governor upon the supporting plate to rotate the movable blades from alignment with the fixed blades.

19. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate and anchored at the other end to the supporting plate to retain the movable blades in alignment with the fixed blades, a pair of centrifugal weights upon the supporting plate, and means connecting the weights with the upper plate to rotate the movable blades from alignment with the fixed blades.

20. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate and anchored at the other end to the supporting plate to retain the movable blades in alignment with the fixed blades, a pair of weight levers pivoted upon the supporting plate, a centrifugal weight upon each lever and means connecting the weights with the upper plate to rotate the movable blades from alignment with the fixed blades.

21. A windmill comprising a lower plate, a plurality of fixed blades having their lower edges integral with the fixed blades and having their inner edges spaced from each other forming a central opening, an upper plate secured to the upper edges of the fixed blades, a pivot secured to the upper plate and extending into the central opening, a supporting plate rotatable upon the pivot and disposed adjacent to the upper plate, a plurality of movable blades integral with the supporting plate and positioned within the central opening, the movable blades being normally in alignment with the fixed blades, the inner ends of the movable blades being spaced from each other forming a central spillway, a spring anchored at one end to the upper plate and anchored at the other end to the supporting plate to retain the movable blades in alignment with the fixed blades, and a centrifugal governor upon the supporting plate to rotate the movable blades from alignment with the fixed blades including a pair of weight levers pivoted to the supporting plate, a centrifugal weight on each lever, a connecting link pivoted to one centrifugal weight and the weight lever for the other weight, and means to retain the connecting link against axial movement.

22. A windmill comprising a plurality of impeller blades rotatable upon an axis and having fixed and movable portions, the fixed portions being uniformly disposed with respect to the axis and the movable portions being disposed uniformly about the axis in all positions to obtain dynamic balance, and means having parts of equal mass in the same plane and uniformly disposed diametrically with respect to the axis in dynamic balance to control the position of the movable portions of the blades with respect to the fixed portions.

23. In a constant speed windmill, blades cooperating with the fluid passing through the windmill, each of said blades being made with uniform continuous contours at either side of its body and having a variable gap provided therein whereby said blade is divided into sections, and means associated with the blades and arranged to be actuated by the operation of the windmill so that one of the sections is circumferentially displaced relative to the other in response to the speed of the windmill, whereby a variable portion of the fluid is permitted to escape through the gap so as to render ineffective an increase in the fluid pressure above a predetermined value.

In testimony whereof I affix my signature.
ADOLF URFER.